(12) United States Patent
Taylor et al.

(10) Patent No.: US 9,944,506 B2
(45) Date of Patent: Apr. 17, 2018

(54) FORKLIFT TRUCK WITH FORWARD-TILTING CAB AND METHOD FOR REDUCING CONTAINER-LOADING HEIGHT OF FORKLIFT TRUCK

(71) Applicant: Linde Material Handling GmbH, Aschaffenburg (DE)

(72) Inventors: Marcus Taylor, Wales (GB); Wayne Edmunds, Newport (GB); Fenghua Shi, Xiamen (CN); Clayton Greenman, Torfaen (GB); Haihui Lian, Xiamen (CN); Qingrong Xu, Xiamen (CN); Zhihong Wang, Xiamen (CN)

(73) Assignee: Linde Material Handling GmbH, Aschaffenburg (DE)

( * ) Notice: Subject to any disclaimer, the term of this patent is extended or adjusted under 35 U.S.C. 154(b) by 0 days.

(21) Appl. No.: 15/234,406

(22) Filed: Aug. 11, 2016

(65) Prior Publication Data

US 2017/0043987 A1  Feb. 16, 2017

(30) Foreign Application Priority Data

Aug. 12, 2015 (CN) .......................... 2015 1 0492389
Aug. 12, 2015 (CN) ..................... 2015 2 0604796 U

(51) Int. Cl.
*B62D 33/067* (2006.01)
*B66F 9/075* (2006.01)

(52) U.S. Cl.
CPC .......... *B66F 9/0759* (2013.01); *B62D 33/067* (2013.01); *B66F 9/07545* (2013.01)

(58) Field of Classification Search
CPC .......................... B66F 9/0759; B62D 33/067

USPC ............. 296/190.01, 190.04, 190.05, 190.06
See application file for complete search history.

(56) References Cited

U.S. PATENT DOCUMENTS

| 2,740,487 | A | * | 4/1956 | Murty | .................... | B62D 25/10 |
| | | | | | | 180/328 |
| 2,781,102 | A | * | 2/1957 | Prichard | ................ | B62D 25/10 |
| | | | | | | 180/69.2 |
| 3,618,692 | A | * | 11/1971 | Stikeleather | ......... | B62D 33/067 |
| | | | | | | 180/89.14 |
| 8,453,798 | B2 | * | 6/2013 | Fischer | ............... | B66F 9/07563 |
| | | | | | | 187/225 |

(Continued)

FOREIGN PATENT DOCUMENTS

| AT | 10902 U2 * | 12/2009 | ........... B62D 33/067 |
| DE | 2516486 A1 | 10/1976 | |

(Continued)

*Primary Examiner* — Hilary L Gutman
(74) *Attorney, Agent, or Firm* — The Webb Law Firm

(57) ABSTRACT

A forklift truck with a forward-tilting cab and a method for reducing the container-loading height of the forklift truck, include a cab and a frame, the cab being connected to the frame so as to be able to tilt forward; and also including a locating mechanism, which is removably provided between the cab and frame when the cab is tilted forward to reduce the cab height, so as to locate the cab when the cab is tilted forward to a preset angle. When loading into a container, the cab of the forklift truck is tilted forward to a preset angle, so that the overall height of the forklift truck is reduced to a height suitable for loading in a container, and the locating mechanism is used to locate the cab, so that the cab is kept in a state in which it is tilted forward to a preset angle.

8 Claims, 6 Drawing Sheets

(56) References Cited

U.S. PATENT DOCUMENTS

2008/0106122 A1 * 5/2008 Grimes ................ B62D 33/067
296/190.05

FOREIGN PATENT DOCUMENTS

| | | | | |
|---|---|---|---|---|
| DE | 102004027202 A1 | * | 10/2005 | ............. B62D 25/10 |
| DE | 102008025056 A1 | * | 12/2009 | ........... B62D 33/067 |
| DE | 102012008150 | * | 10/2013 | ......... B62D 33/0604 |
| EP | 2065334 A1 | | 6/2009 | |
| GB | 846649 A | * | 8/1960 | ............. B66F 9/082 |
| JP | S5459625 | | 4/1979 | |
| JP | 57205278 A | * | 12/1982 | ........... B62D 33/067 |
| JP | 59043271 U1 | | 3/1984 | |
| JP | 01076376 U1 | | 5/1989 | |
| JP | 10316054 | | 12/1998 | |
| JP | 11335094 | | 12/1999 | |
| WO | WO 2006080488 A1 | * | 8/2006 | ........... B62D 33/067 |
| WO | WO 2007012400 A1 | * | 2/2007 | ........... B62D 21/152 |

\* cited by examiner

FORKLIFT TRUCK WITH FORWARD-TILTING CAB AND METHOD FOR REDUCING CONTAINER-LOADING HEIGHT OF FORKLIFT TRUCK

CROSS REFERENCE TO RELATED APPLICATIONS

This application claims priority to Chinese Patent Application Nos. 201510492389.0 and 201520604796.1, both filed Aug. 12, 2015, herein incorporated by reference in their entireties.

BACKGROUND OF THE INVENTION

Field of the Invention

The present disclosure relates to the field of forklift trucks, in particular to a forklift truck with forward-tilting cab and a method for reducing the container-loading height of a forklift truck.

Description of Related Art

A significant number of forklift trucks are transported by sea after leaving the factory. Most forklift trucks transported by sea are loaded into containers. This does not pose any problems for forklift trucks whose overall height is lower than the height of a common container, but in the case of forklift trucks whose overall height is higher than that of a common container, e.g. heavy forklift trucks, the higher height of the cab thereof makes direct loading into a container difficult. Thus, for a forklift truck in this category, the height of the cab thereof presents an obstacle to loading of the forklift truck into a container. As a consequence, at the present time, in most cases the cab of a forklift truck in this category is completely removed directly or a special container is used to solve the problem of loading the forklift truck into a container. However, the complete removal of a forklift truck cab will undoubtedly waste time and increase the cost of labor, while the use of a special container will increase the cost of transporting the forklift truck. Thus, at present, the issue of how to achieve low-cost and highly efficient transportation of forklift trucks in this category, in terms of the loading of forklift trucks into containers, has become a problem that is in urgent need of solution in the forklift industry.

SUMMARY OF THE INVENTION

The present invention provides a forklift truck with a forward-tilting cab and a method for reducing a container-loading height of a forklift truck, which solve the problem that a forklift truck whose overall height is higher than a height of a common container is difficult to load into a container, by designing the cab of the forklift truck to be able to tilt forward so as to reduce the overall height thereof during transportation.

The technical solution by which the present invention solves its technical problem is as follows: a forklift truck, including a cab and a frame, the cab being connected to the frame so as to be able to tilt forward; and also including a locating mechanism, which is removably provided between the cab and the frame when the cab is tilted forward to reduce the cab height, so as to locate the cab when the cab is tilted forward to a preset angle.

In one embodiment, the locating mechanism includes at least one pull rod having one end removably connected to a bottom end of the cab and another end removably connected to the frame.

In one embodiment, a hydraulic cylinder is installed on the frame, corresponding to a rear side of a position of rotary connection of the frame and the cab, before the pull rod is installed or after the pull rod is removed; after removal of the pull rod, a free end of a piston rod of the hydraulic cylinder is connected to the bottom end of the cab, corresponding to a rear side of the position of rotary connection of the bottom end of the cab and the frame, so as to be able to push up the cab when the forklift truck is being serviced.

In one embodiment, also included is a mechanical locating lock, for serving a safety protection function for the cab when the hydraulic cylinder pushes up the cab.

In one embodiment, a first installation part is provided on the bottom end of the cab, corresponding to a rear side of the position of rotary connection of the bottom end of the cab and the frame, one end of the pull rod being removably connected to the first installation part; the free end of the piston rod of the hydraulic cylinder is connected to the first installation part of the cab after one end of the pull rod is removed from the first installation part.

In one embodiment, when the piston rod of the hydraulic cylinder is in an extended state, the center of gravity of the cab is located on a rear side of the position of rotary connection of the cab and the frame.

In one embodiment, a second installation part is provided on the frame, corresponding to a rear side of the position of rotary connection of the frame and the cab, another end of the pull rod being removably connected to the second installation part.

In one embodiment, a support bracket of the cab is provided on the frame, corresponding to a rear side of the position of rotary connection of the frame and the cab; the second installation part is provided on a front side of the support bracket.

In one embodiment, one end of the pull rod is connected to the cab using a shaft in coordination with a shaft locating component or a bolt in coordination with a nut, and another end of the pull rod is connected to the frame using a shaft in coordination with a shaft locating component or a bolt in coordination with a nut.

A method for reducing the container-loading height of a forklift truck, wherein a cab of the forklift truck is connected to a frame of the forklift truck so as to be able to tilt forward; includes, when loading into a container, tilting forward the cab of the forklift truck to a preset angle, so that the height of the forklift truck cab is reduced to a height suitable for loading into a container, and locating the cab using a locating mechanism, so that the cab is kept in a state in which it is tilted forward to a preset angle.

Compared with the prior art, the present invention has the following beneficial effects:

1. By designing the cab of the forklift truck to be able to tilt forward relative to the forklift frame, the present invention reduces the overall height of the forklift truck when the latter is loaded into a container, and uses a locating mechanism to locate the forklift cab when the cab is tilted forward to a preset angle, enabling the forward-tilted cab of the forklift to be kept in a position with a suitable height, so that when the forklift is loaded in a container, the height of the forklift can be lower than that of a common container and thereby facilitate container loading. Thus the present invention obviates the need to completely remove the cab of a forklift truck when the latter is being shipped, and enables loading into a common container, thereby significantly reducing the time and cost involved in shipping forklift trucks, and enabling forklift trucks to be shipped in a low-cost and highly efficient manner. Furthermore, the arrangement of the locating mechanism makes shipping of the forklift truck safer, preventing the cab from swinging during transport and thereby knocking into glass on the cab.

2. The locating mechanism includes a pull rod, the two ends of which pull rod can be connected to the cab and the forklift frame respectively using a shaft or bolt with fittings thereof; this has characteristics such as a simple structure, convenient assembly and disassembly, and low cost.

3. The present invention builds upon the ability of the cab to tilt forward relative to the frame by further providing a hydraulic cylinder, which is used to push up the cab when the forklift needs to be serviced, so that the cab tilts forward to a preset angle, thereby increasing the space for servicing. In particular, the piston rod of the hydraulic cylinder can be installed directly on the first installation part disposed on the cab when the pull rod is removed, thereby avoiding the need to additionally provide another installation part on the cab, making the structure of the bottom end of the cab more compact and simple, and helping to save material costs.

4. Since the center of gravity of the forklift cab is located on a rear side of the position of rotary connection of the cab and the frame when the piston rod of the hydraulic cylinder is in an extended state, the hydraulic cylinder can exploit the weight of the cab itself during return, so that both the tilting and the returning of the cab are very smooth, and will not cause the hydraulic cylinder to suffer any impact; this helps to prolong the service life of the hydraulic cylinder.

The present invention is explained in further detail below in conjunction with the accompanying drawings and embodiments, but the forklift truck with forward-tilting cab and the method for reducing the container-loading height of a forklift truck according to the present invention are not restricted to embodiments.

DESCRIPTION OF THE INVENTION

Figure 1:
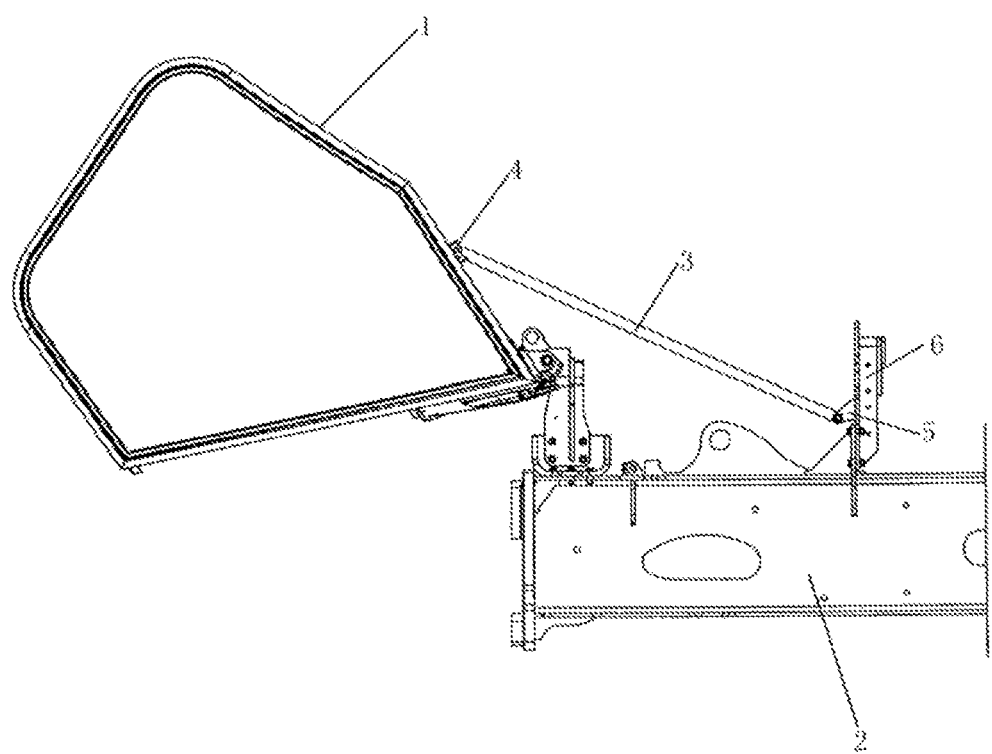
FIG. 1 is a structural schematic diagram of a cab according to the present invention when tilted forward by 122°.
Figure 2:
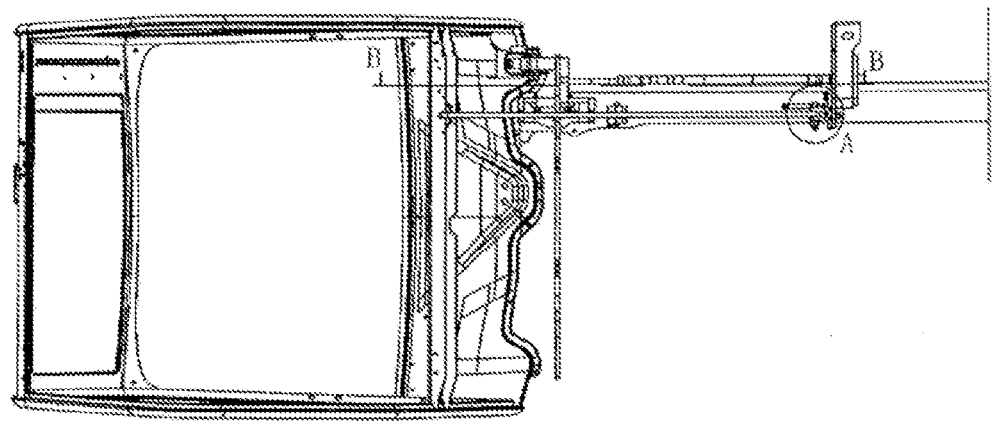
FIG. 2 is a top view corresponding to FIG. 1.

Referring to FIGS. 1-7, a forklift truck with forward-tilting cab according to the present invention includes a cab 1 and a frame 2. The cab 1 is connected to the frame 2 so as to be able to tilt forward; specifically, a bottom front end of the cab 1 is rotatably connected to the frame 2, so that the cab 1 can tilt forward. The present invention also includes a locating mechanism, which is removably provided between the cab 1 and frame 2 when the cab 1 is tilted forward to reduce the cab height, so as to locate the cab 1 when the cab 1 is tilted forward to a preset angle.

In this embodiment, the locating mechanism includes at least one pull rod 3, the pull rod 3 having one end removably connected to a bottom end of the cab 1 and another end removably connected to the frame 2. Besides this, the locating mechanism may of course be another supporting component, e.g. a hydraulic cylinder.

In this embodiment, a hydraulic cylinder 7 is also installed on the frame 2, corresponding to a rear side of a position of rotary connection of the frame and the cab 1. The hydraulic cylinder 7 is used for pushing the cab 1 up to a certain angle when the forklift truck needs servicing, so that there is a larger space for servicing beneath the cab 1. As a preference, the present invention also includes a mechanical locating lock (not shown in the figures), which is a pin similar to a bar in shape, usually left on the forklift truck when not in use, but when the forklift truck is being serviced, the mechanical locating lock is taken out and placed between the cab 1 and the frame 2; besides this, the mechanical locating lock may also be installed directly in a given position on the cab 1 or frame 2. When the hydraulic cylinder 7 pushes up the cab 1, the mechanical locating lock serves a safety protection function for the cab 1, avoiding a situation where a piston rod 71 of the hydraulic cylinder 7 breaks when in an extended state so that the cab 1 is no longer located and falls back, jeopardizing the personal safety of a servicing operative therebelow. Also, if the piston rod 71 of the hydraulic cylinder 7 breaks so that the action of supporting the cab 1 is lost, the cab 1 will fall onto the mechanical locating lock, which is used to prop up the cab 1, preventing the cab 1 from continuing to fall and causing a crushing injury to a servicing operative therebelow. Furthermore, in order to avoid a situation where the piston rod 71 of the hydraulic cylinder, when in an extended state, automatically retracts under the action of the weight of the cab 1, a reversing valve can be installed on an oil tank of the forklift, so that the piston rod 71 of the hydraulic cylinder 7, once extended, cannot automatically retract without human control.

The hydraulic cylinder 7 may be installed on the frame 2 before the pull rod 3 is installed or after the latter is removed. After removal of the pull rod 3, a free end of the piston rod 71 of the hydraulic cylinder 7 is connected to the bottom end of the cab 1, corresponding to a rear side of the position of rotary connection of the bottom end of the cab and the frame 2, so as to be able to push up the cab 1, so that the latter tilts forward by a given angle.

In this embodiment, a first installation part 4 is provided on the bottom end of the cab 1, corresponding to a rear side of the position of rotary connection of the bottom end of the cab and the frame 2; one end of the pull rod 3 is removably connected to the first installation part 4. A second installation part 5 is provided on the frame 2, corresponding to a rear side of the position of rotary connection of the frame and the cab 1; another end of the pull rod 3 is removably connected to the second installation part 5.

In this embodiment, the piston rod 71 of the hydraulic cylinder 7 is connected to the first installation part 4 of the cab 1 when one end of the pull rod 3 is removed from the first installation part 4. A third installation part 8 is provided on the frame 2, corresponding to a rear side of the position of rotary connection of the frame and the cab 1; a cylinder body of the hydraulic cylinder 7 is installed at the third installation part 8.

In this embodiment, when the piston rod 71 of the hydraulic cylinder 7 is in an extended state, the center of gravity of the cab 1 is located on a rear side of the position of rotary connection of the cab 1 and the frame 2.

In this embodiment, a support bracket 6 of the cab 1 is provided on the frame 2, corresponding to a rear side of the position of rotary connection of the frame and the cab 1; the second installation part 5 is provided on a front side of the support bracket 6. The third installation part 8 for the cylinder body 72 of the hydraulic cylinder 7 is provided on the frame 2; specifically, the third installation part 8 is located between the support bracket 6 and the position of rotary connection of the frame 2 and the cab 1.

In this embodiment, the first installation part 4, second installation part 5 and third installation part 8 specifically each include two installation plates arranged facing one another; an accommodating space is formed between the two installation plates, for accommodating the two ends of the pull rod 3, the bottom of the cylinder body 72 of the hydraulic cylinder 7, and the free end of the piston rod 71 of the hydraulic cylinder 7, respectively. Here, it is also possible for the first installation part 4, second installation part 5 and third installation part 8 to include only one installation plate, or to employ another structure such as an installation seat provided with an installation slot.

In this embodiment, the bottom front end of the cab 1 may be connected to a front part of the forklift truck using a hinge, or another component in which a shaft etc. is used as an axis of rotation.

Figure 5:
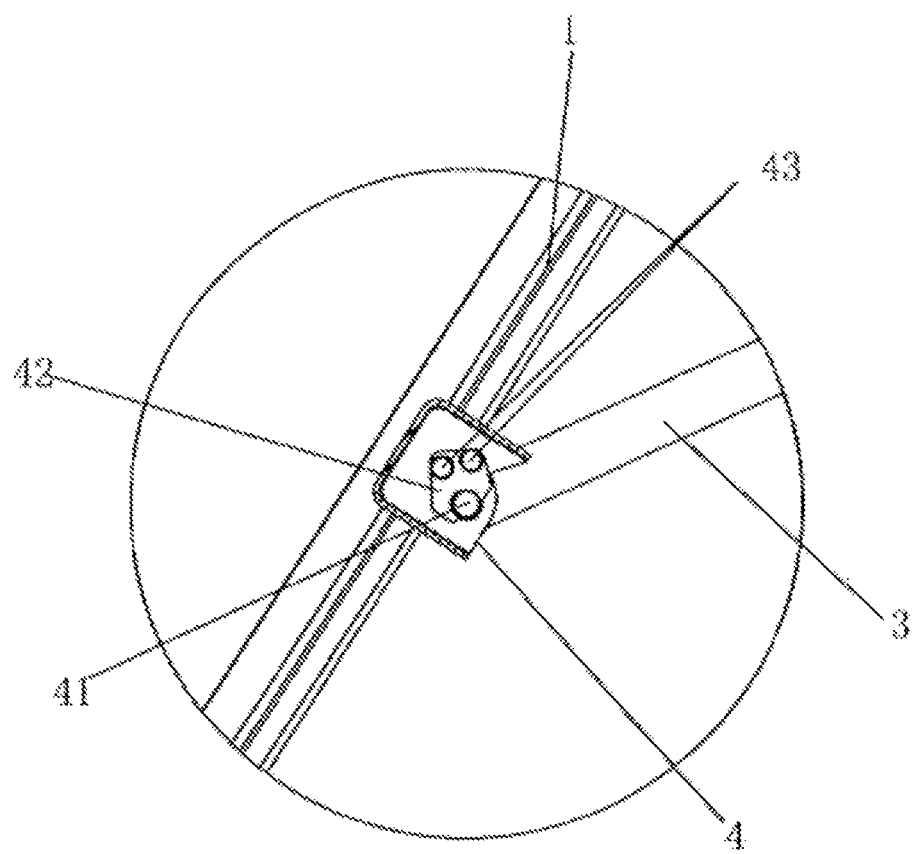
FIG. 5 is an enlarged schematic diagram of part C in FIG. 4.
Figure 6:
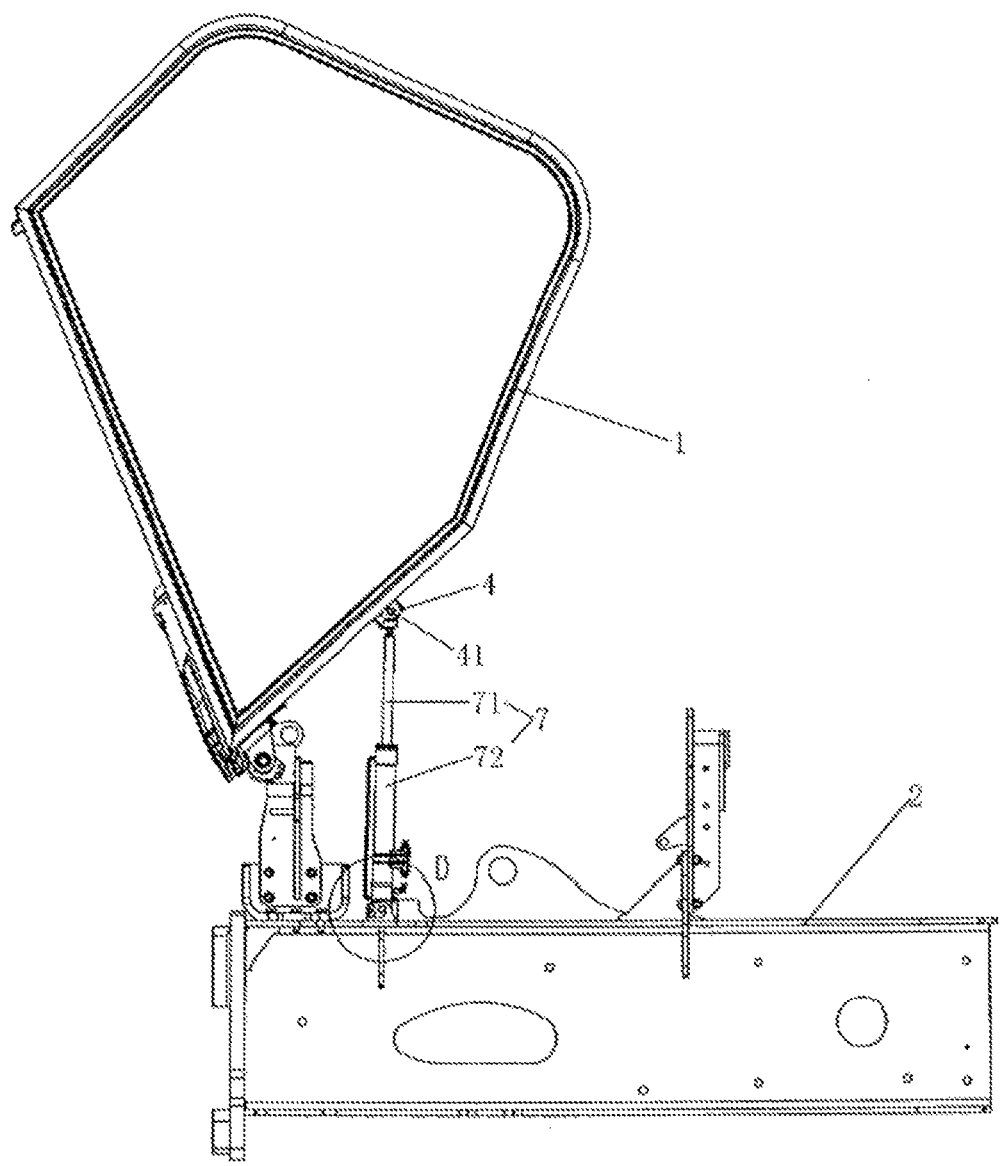
FIG. 6 is a structural schematic diagram of a cab according to the present invention when tilted forward by 50°.

As FIG. 5 shows, one end of the pull rod is connected to two installation plates (i.e. the first installation part 4) disposed on the cab 1, using a shaft 41 in coordination with a shaft locating component. Specifically, one end of the pull rod 3 is provided with a through-hole in a radial direction, while the two installation plates are respectively provided with through-holes located on the same axis; one end of the pull rod 3 is inserted into the accommodating space between the two installation plates, the shaft 41 is passed through the through-holes in the two installation plates of the cab 1 and the through-hole in one end of the pull rod 3, and the shaft locating component is used to locate the shaft. The shaft locating component specifically includes a locating engagement plate 42 and screws 43; the locating engagement plate 42 is locked to an outer side of the installation plate using the screws 43, thereby locating the shaft 41 axially. Besides this, one end of the pull rod 3 may also be connected to the first installation part 4 in another way, such as by a bolt in coordination with a nut.

Figure 3:
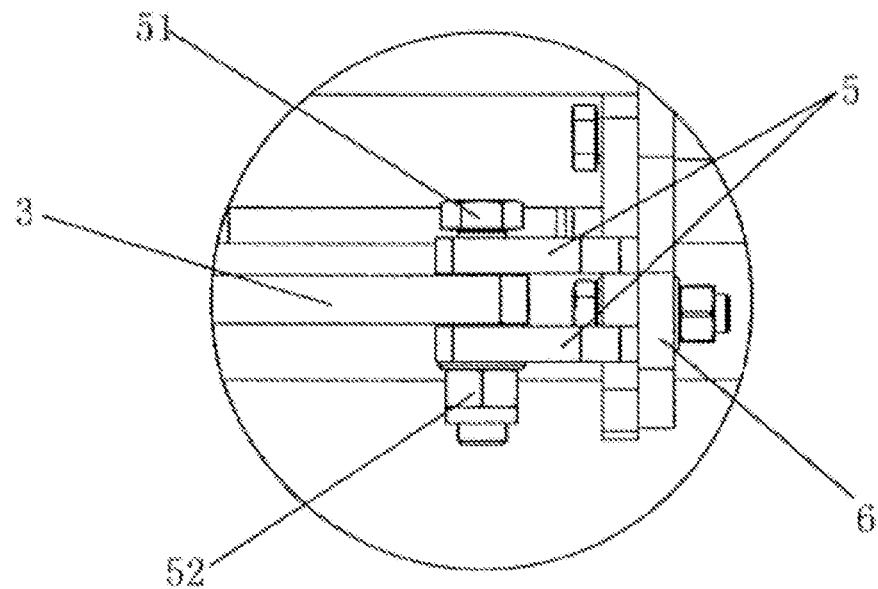
FIG. 3 is an enlarged schematic diagram of part A in FIG. 2.
Figure 4:
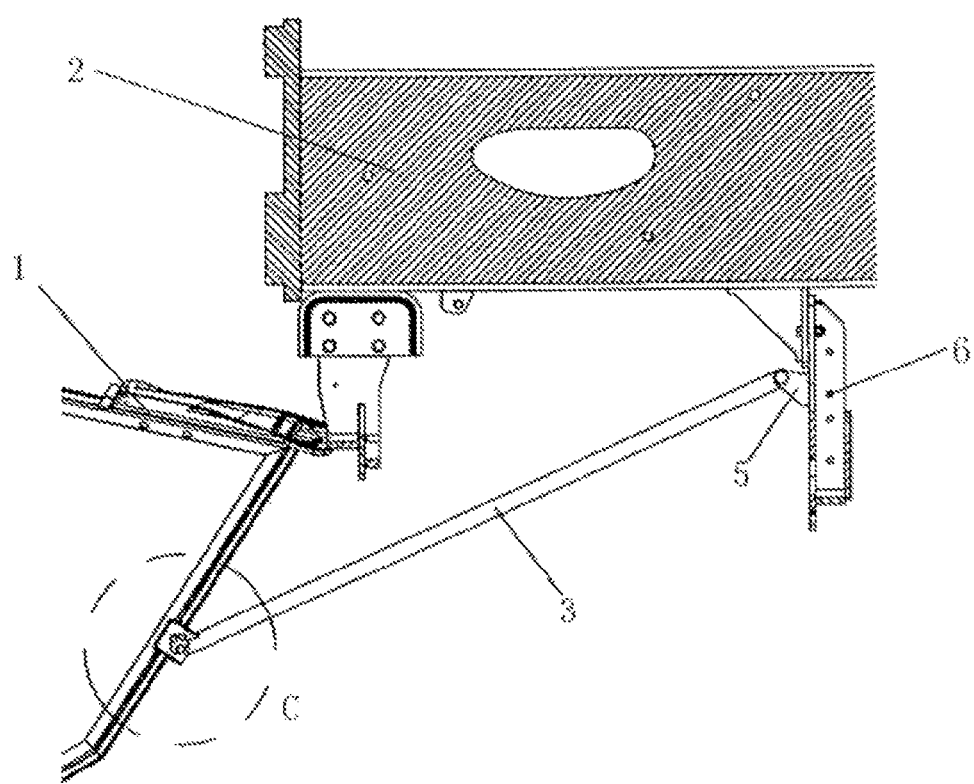
FIG. 4 is a B-B sectional schematic diagram corresponding to FIG. 2.

As FIG. 3 shows, another end of the pull rod 3 is connected to the second installation part 5 of the frame 2 using a bolt 51 in coordination with a nut 52. Specifically, two installation plates (i.e. the second installation part 5) on the frame 2 are respectively provided with through-holes located on the same axis, while the other end of the pull rod 3 is provided with a through-hole in a radial direction; the other end of the pull rod 3 is inserted into the accommodating space between the two installation plates of the frame 2, the bolt 51 is passed through the through-holes in the two installation plates and the through-hole in the other end of the pull rod 3, and the nut 52 is screwed onto a tail end of the bolt. Furthermore, to reduce friction between components, a washer may be slipped onto the bolt 51. Here, the other end of the pull rod 3 may also be connected to the second installation part 5 in another way, such as by a shaft in coordination with a shaft locating component.

Figure 7:
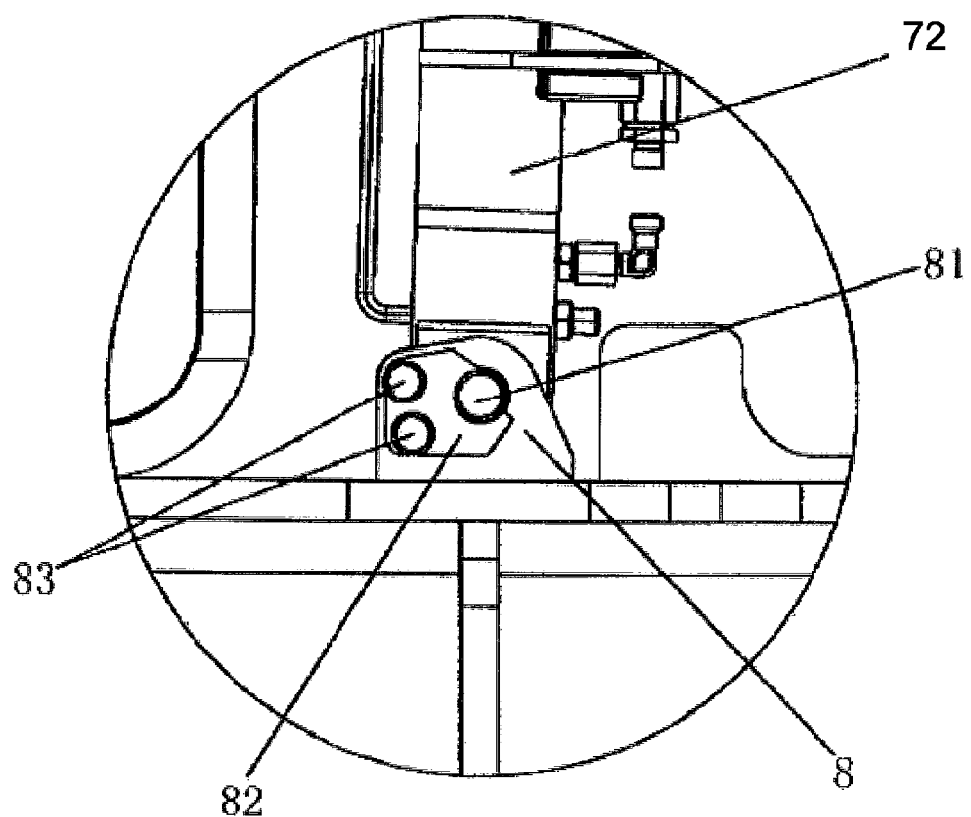
FIG. 7 is an enlarged schematic diagram of part D in FIG. 6.

In this embodiment, as FIG. 7 shows, the cylinder body 72 of the hydraulic cylinder 7 is connected to the third installation part 8 of the frame 2 in the same way as one end of the pull rod 3 is connected, i.e. the cylinder body 72 is connected to the third installation part 8 using a shaft 81 in coordination with a locating engagement plate 82 and screws 83. The free end of the piston rod 71 is connected to the first installation part 4 of the cab 1 in the same way as one end of the pull rod is connected, i.e. the free end of the cylinder body 71 is connected to the first installation part 4 using a shaft 41 in coordination with a locating engagement plate 42 and screws 43. Besides this, the piston rod 71 and the cylinder body 72 of the hydraulic cylinder 7 may also be installed in another way, such as by a bolt in coordination with a nut.

The method of the present invention for reducing the container-loading height of a forklift truck is as follows: when loading into a container, forks and a mast of the forklift truck are removed, then a cab 1 of the forklift truck is tilted forward to a preset angle, so that the overall height of the forklift truck is reduced to a height suitable for loading into a container, and a locating mechanism is used to locate the cab 1, so that the cab 1 is kept in a state in which it is tilted forward to a preset angle. Here, the locating mechanism is not restricted to the pull rod described above, but may be another supporting component such as a hydraulic cylinder.

When the forklift truck with forward-tilting cab according to the present invention needs to be loaded into a container, the forks and mast of the forklift truck are removed, then the forklift cab 1 is tilted forward by about 122°, the two ends of the pull rod 3 are connected to the first installation part 4 that is arranged on the cab 1 in advance and to the second installation part 5 that is arranged on the frame 2 in advance, and the pull rod 3 is used to pull on the cab 1 and thereby prevent movement of the latter, so that the cab 1 is kept in a state in which it is tilted forward by about 122°. At this time, the height of the forklift cab 1 is clearly somewhat lower than that of the cab 1 before tilting, so that the forklift truck is suitable for loading into a common container. Thus, through this arrangement, the present invention can obviate the need to completely remove the cab 1 when a forklift whose cab height is higher than that of a common container is transported by sea, and also obviate the need to use a special custom-made large container, thereby significantly reducing the time and cost involved in shipping forklift trucks.

The hydraulic cylinder 7 can be installed in a corresponding position of the frame 2 before or after the forklift is transported. After transportation of the forklift truck is complete, when the two ends of the pull rod 3 are removed from the cab 1 and the frame 2 respectively, the free end of the piston rod 71 of the hydraulic cylinder 7 is connected to the first installation part 4 of the cab 1. Thus, when the forklift truck needs to be serviced, the hydraulic cylinder 7 may be used to push up the cab 1 of the forklift truck, so that the cab 1 tilts forward by about 50° and the forklift truck has a larger space for servicing, to facilitate servicing. When the piston rod 71 of the hydraulic cylinder 7 is in an extended state and pushing up the cab 1 of the forklift, since the center of gravity of the cab 1 is located on a rear side of the position of rotary connection of the cab 1 and the frame 2, the hydraulic cylinder 7 can exploit the weight of the cab 1 itself during return, so that both the tilting and the returning of the cab 1 are very smooth, and will not cause the hydraulic cylinder to suffer any impact; this helps to prolong the service life of the hydraulic cylinder 7.

The above embodiments are merely intended to explain further the forklift truck with forward-tilting cab and the method for reducing the container-loading height of a forklift truck according to the present invention. However, the present invention is not limited to embodiments. Any simple amendments, equivalent changes or modifications made to the above embodiments according to the technical substance of the present invention shall fall within the scope of protection of the technical solution of the present invention.

The invention claimed is:

1. A forklift truck with a forward-tilting cab, comprising a cab, a frame, and a locating mechanism,
   wherein the cab is connected to the frame so as to be able to tilt forward, and wherein the locating mechanism is removably provided between the cab and the frame when the cab is tilted forward to reduce a cab height, so as to locate the cab when the cab is tilted forward to a preset angle,
   wherein the locating mechanism comprises at least one pull rod having one end removably connected to a bottom end of the cab and another end removably connected to the frame,
   wherein a hydraulic cylinder is installed on the frame rearwardly of a rotary connection of the frame and the cab, before the pull rod is installed or after the pull rod is removed; after removal of the pull rod, a free end of a piston rod of the hydraulic cylinder is connected to the bottom end of the cab rearwardly of the rotary connection of the frame and the cab, so as to be able to push up the cab when the forklift truck is being serviced, and
   wherein, when the piston rod of the hydraulic cylinder is in an extended state, a center of gravity of the cab is located rearwardly of the rotary connection of the frame and the cab.

2. The forklift truck with the forward-tilting cab according to claim 1, wherein a first installation part is provided on the bottom end of the cab rearwardly of the rotary connection of the frame and the cab, one end of the pull rod being removably connected to the first installation part; the free end of the piston rod of the hydraulic cylinder is connected to the first installation part of the cab after one end of the pull rod is removed from the first installation part.

3. The forklift truck with the forward-tilting cab according to claim 1, wherein a second installation part is provided on the frame rearwardly of the rotary connection of the frame and the cab, another end of the pull rod being removably connected to the second installation part.

4. The forklift truck with the forward-tilting cab according to claim 3, wherein a support bracket of the cab is provided on the frame rearwardly of the rotary connection of the frame and the cab; and the second installation part is provided on a front side of the support bracket.

5. The forklift truck with the forward-tilting cab according to claim 1, wherein one end of the pull rod is connected to the cab using a shaft in coordination with a shaft locating component or a bolt in coordination with a nut, and another end of the pull rod is connected to the frame using a shaft in coordination with a shaft locating component or a bolt in coordination with a nut.

6. A method for reducing a container-loading height of and servicing a forklift truck, wherein a cab of the forklift truck is connected to a frame of the forklift truck so as to be able to tilt forward; the method comprising:
   when loading into a container, tilting the cab of the forklift truck forward to a first preset angle so that a height of the forklift truck cab is reduced to a height suitable for loading into the container, and locating the cab using a locating mechanism so that the cab is kept in a state in which the cab is tilted forward to the first preset angle, wherein the locating mechanism comprises at least one pull rod having one end removably connected to a bottom of the cab and another end removably connected to the frame; and
   before or after the forklift truck is transported, tilting the cab of the forklift truck forward to a second preset angle using a hydraulic cylinder, wherein a free end of a piston rod of the hydraulic cylinder is connected to the bottom of the cab rearwardly of a rotary connection of the frame and the cab, wherein, when the piston rod of the hydraulic cylinder is in an extended state, a center of gravity of the cab is located rearwardly of the rotary connection of the frame and cab.

7. A forklift truck with a forward-tilting cab, comprising a cab, a frame, and a locating mechanism,
   wherein the cab is connected to the frame so as to be able to tilt forward, and wherein the locating mechanism is removably provided between the cab and the frame when the cab is tilted forward to reduce a cab height, so as to locate the cab when the cab is tilted forward to a preset angle,
   wherein the locating mechanism comprises at least one pull rod having one end removably connected to a bottom end of the cab and another end removably connected to the frame,
   wherein a hydraulic cylinder is installed on the frame rearwardly of a rotary connection of the frame and the cab, before the pull rod is installed or after the pull rod is removed; after removal of the pull rod, a free end of a piston rod of the hydraulic cylinder is connected to the bottom end of the cab rearwardly of the rotary connection of the frame and the cab, so as to be able to push up the cab when the forklift truck is being serviced, and
   wherein a first installation part is provided on the bottom end of the cab rearwardly of the rotary connection of the frame and the cab, one end of the pull rod being removably connected to the first installation part; the free end of the piston rod of the hydraulic cylinder is connected to the first installation part of the cab after one end of the pull rod is removed from the first installation part.

8. A method for reducing a container-loading height of and servicing a forklift truck, wherein a cab of the forklift truck is connected to a frame of the forklift truck so as to be able to tilt forward; the method comprising:
   when loading into a container, tilting the cab of the forklift truck forward to a first preset angle so that a height of the forklift truck cab is reduced to a height suitable for loading into the container, and locating the cab using a locating mechanism, so that the cab is kept in a state in which the cab is tilted forward to the first preset angle, wherein the locating mechanism comprises at least one pull rod having one end removably connected to a bottom of the cab and another end removably connected to the frame; and
   before or after the forklift truck is transported, tilting the cab of the forklift truck forward to a second preset angle using a hydraulic cylinder, wherein a free end of a piston rod of the hydraulic cylinder is connected to the bottom of the cab rearwardly of a rotary connection of the frame and the cab,
   wherein a first installation part is provided on the bottom of the cab rearwardly of the rotary connection of the frame and the cab, wherein one end of the pull rod is removably connected to the first installation part when the cab of the forklift truck is tilted at the first preset angle, and wherein the free end of the piston rod of the hydraulic cylinder is connected to the first installation part of the cab when the pull rod is removed from the first installation part.

* * * * *